(12) United States Patent
Shafet et al.

(10) Patent No.: US 11,017,055 B2
(45) Date of Patent: May 25, 2021

(54) HOTSPOTS FOR PROBABILISTIC MODEL TESTING AND CYBER ANALYSIS

(71) Applicant: PayPal, Inc., San Jose, CA (US)

(72) Inventors: Yuri Shafet, Beer Sheba (IL); Shlomi Boutnaru, Modi'in-Maccabim-Re'ut (IL); Artum Zolotushko, Beer Sheva (IL); Eyal Ben Simon, Givat Elah (IL); Amit Benbassat, Tel Aviv-Jaffa (IL)

(73) Assignee: PayPal, Inc., San Jose, CA (US)

( * ) Notice: Subject to any disclaimer, the term of this patent is extended or adjusted under 35 U.S.C. 154(b) by 957 days.

(21) Appl. No.: 15/638,633

(22) Filed: Jun. 30, 2017

(65) Prior Publication Data
US 2019/0005000 A1    Jan. 3, 2019

(51) Int. Cl.
| | |
|---|---|
| *G06F 17/18* | (2006.01) |
| *G06N 3/12* | (2006.01) |
| *G06N 3/08* | (2006.01) |
| *G06N 3/04* | (2006.01) |
| *G06N 20/00* | (2019.01) |

(52) U.S. Cl.
CPC ............. *G06F 17/18* (2013.01); *G06N 3/086* (2013.01); *G06N 3/126* (2013.01); *G06N 3/0472* (2013.01); *G06N 20/00* (2019.01)

(58) Field of Classification Search
CPC ........ G06F 17/18; G06N 3/086; G06N 3/126; G06N 20/00; G06N 3/0472
See application file for complete search history.

(56) References Cited

U.S. PATENT DOCUMENTS

| 9,088,601 | B2 * | 7/2015 | Friedrichs | ............. G06F 21/564 |
| 9,521,156 | B2 | 12/2016 | Boutnaru et al. | |
| 9,654,487 | B2 | 5/2017 | Boutnaru et al. | |
| 9,680,851 | B2 | 6/2017 | Boutnaru et al. | |
| 2016/0173515 | A1 | 6/2016 | Boutnaru et al. | |
| 2016/0219064 | A1 | 7/2016 | Boutnaru et al. | |
| 2017/0032120 | A1 | 2/2017 | Tolpin et al. | |

OTHER PUBLICATIONS

Weilin Xu, Yanjun Qi, and David Evans, "Automatically Evading Classifiers A Case Study on PDF Malware Classifiers", Feb. 2016, Network and Distributed System Security Symposium 2016 (NDSS), San Diego, pp. 1-15. (Year: 2016).*

(Continued)

*Primary Examiner* — Kamran Afshar
*Assistant Examiner* — Ying Yu Chen

(57) ABSTRACT

Techniques for identifying weaknesses in a probabilistic model such as an artificial neural network using an iterative process are disclosed. A seed file may be obtained and variant files generated therefrom. The variant files may be evaluated for their fitness, based upon the ability of the variant files to cause the probabilistic model to fail. The fittest variants, which may refer to those variants that are most successful in causing the model to fail, may be selected. From these selected variants, a next generation of variant files may be created. The next generation of variant files may be evaluated for their fitness. At each step of fitness evaluation or at the end of the iterative process, a map of the fittest variants may be generated to identify hotspots. These hotspots may reveal segments of code or a file that are problematic for the model, which can be used to improve the model.

19 Claims, 7 Drawing Sheets

(56) References Cited

OTHER PUBLICATIONS

Shun Tobiyama, Yukiko Yamaguchi, Hajime Shimada, Tomonori Ikuse, and Takeshi Yagi, "Malware Detection with Deep Neural Network Using Process Behavior", 2016, 2016 IEEE 40th Annual Computer Software and Applications Conference, pp. 577-582. (Year: 2016).*

Nedim Srndic and Pavel Laskov, "Practical Evasion of a Learning-Based Classifier: A Case Study", 2014, 2014 IEEE Symposium on Security and Privacy, pp. 197-211. (Year: 2014).*

Fangfang Dai, Kangfeng Zheng, Bin Wu, and Shoushan Luo, "Using Genetic Algorithm for Optimal Security Hardening in Risk Flow Attack Graph", May 31, 2015, KSII Transactions on Internet and Information Systems vol. 9, No. 5, May 2015, pp. 1920-1937. (Year: 2015).*

Syed Bilal Mehdi, Ajay Kumar Tanwani, and Muddassar Farooq, "IMAD: In-Execution Malware Analysis and Detection", 2009, GECCO'09, pp. 1553-1560. (Year: 2009).*

Fei Zhang, Patrick P. K. Chan, Battista Biggio, Daniel S. Yeung, and Fabio Roli, "Adversarial Feature Selection Against Evasion Attacks", Date of Publication: Apr. 21, 2015, IEEE Transactions on Cybernetics, vol. 46, No. 3, March 2016, pp. 766-777. (Year: 2015).*

Aziz Makandar and Anita Patrot, "Malware Class Recognition Using Image Processing Techniques", Feb. 24-26, 2017, 2017 International Conference on Data Management, Analytics and Innovation (ICDMAI), pp. 76-80. (Year: 2017).*

\* cited by examiner

HOTSPOTS FOR PROBABILISTIC MODEL TESTING AND CYBER ANALYSIS

BACKGROUND

An artificial neural network ("ANN") or a machine learning ("ML") model can be used to make various determinations by a computer system. In some instances, an ANN or ML may be trained using data in order to reach these determinations.

Quality and quantity of training data can have an effect on the usefulness and accuracy of an ANN or ML. Even after an ANN or ML is trained, however, how subsequent determinations are reached by an ANN or ML may be partially or completely opaque to a user. That is, an ANN or ML may reach a determination based on some input data, but a user may not know exactly why.

In some instances, an ANN or ML's decision making process may be highly dependent on certain characteristics of the data. Changing these characteristics can have a negative impact on the ability of the ANN or ML to operate correctly, and it may not be apparent to a user why or how such a performance issue is occurring.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter.

DETAILED DESCRIPTION

Figure 1:
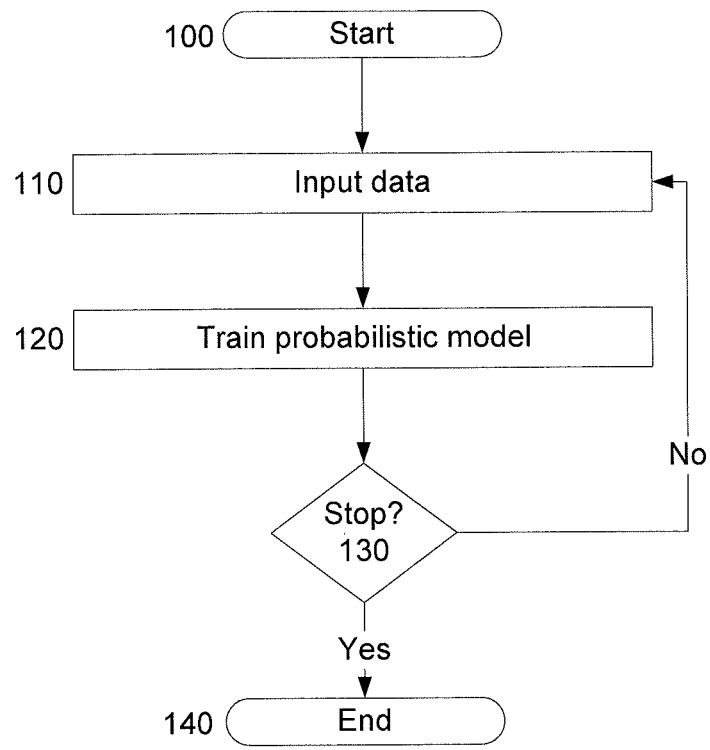
FIG. 1 is an example of training a probabilistic model according to a disclosed implementation.

The disclosed implementations can determine how changing data in some domain will affect prediction by a probabilistic model (e.g., ANN or ML model) trained on the same domain. For example, if a probabilistic model classifies files as malicious (or not malicious), the disclosed implementations record or map how changing files of specific malware will affect the accuracy of the model. In some instances, changes to malware code that allow the malware to avoid detection by a malware detector may accumulate in specific regions of the malicious files. Places where the "successful" changes accumulate can be referred to as "hotspots." Based upon the accumulation of the recorded or mapped data, the probabilistic model can be modified to improve its detection of the malware (i.e., reduce the effectiveness of the changes in the hotspots). In other words, by identifying locations within data that greatly impact a decision made by a probabilistic model, the model can be modified and/or trained such that a change to a hotspot will not dramatically reduce the effectiveness of a model. In various embodiments it would be undesirable, for example, to have small changes to underlying data greatly reduce model accuracy.

ANN and/or ML model can be thought of as probabilistic models that can be applied to a variety of challenges in computer science including computer vision, speech recognition, text recognition, image recognition, malware identification, etc. Typically, the process involves inputting known source data into the ANN or ML model to train it to identify particular features of interest. The mechanism by which the ANN/ML model learns to identify a particular feature based upon this training can be considered a black box. That is, the criteria by which a given file is identified as having particular features, or the algorithm that is being applied by the model, may be unknown. Put another way, studying the structure of the ANN/ML model will provide little insight into the function being approximated by the ANN/ML model. An ANN/ML model is generally not deterministic In some instances, ANN/ML models can be used as a defense against cyber-attacks. Cyber security is constantly evolving to identify, prevent, and/or slow progression of attacks to critical infrastructure as well as personal computers. If malware is modified at a particular spot, a neural network that previously identified the original malware, may fail to detect the modified form. Recently, for example, the WannaCry ransomware attack of 2017 left millions of computers infected including, among others, the computer system for the National Health Service of Britain. The original WannaCry ransomware contained a kill switch that slowed its progression. In subsequent versions of the malware, however, the kill switch was removed. It would be advantageous to identify such important features of a malware file so that a neural network can predict such a mutation of the original file, identify the mutated version, prevent the infection in the first place, and/or slow propagation of the malware.

Thus, it would be advantageous to have a mechanism to identify the function being approximated by the ANN/ML model. This can be useful to identify weaknesses of existing ANN/ML models and to improve upon such weaknesses such that the ANN/ML model provides better identifications/classifications.

A number of advantages can be realized through the disclosed implementations. In an implementation a probabilistic model trained to detect, for example, malware or a feature of an image. An algorithm can be applied to one or more files to determine one or more hotspots in malware or other file (e.g., image, audio, and/or video file). The algorithm may make changes in the file that cause the model to be less accurate at detecting the existence of a feature. For example, the probabilistic model may not be capable of detecting malware, identifying the eyes in an image, or recognizing text of a certain language. After a hotspot(s) is identified in the files, it can be used to analyze the probabilistic model and infer the reason behind the model's predictions. Also disclosed is a method to generate a smart data generator that targets changes in the files within identified hotspots. This can decrease the time required for an evolutionary algorithm to perform a mutation on a file effectively (i.e. a mutation that contributes to individual fitness or otherwise aids in the progression of the algorithm). In addition, "negative hotspots" can be identified inside the file which can, for example, prevent the malware from executing correctly. This can be useful to improve active defense measures against the malware. Finally, the identified hotspots between different families of a file type can be compared. As an example, using the location identified in a file as a hotspot, reverse engineering of the malware can be more readily performed because a researcher can focus on specific places in the file.

FIG. 1 is an example of an overview of training a probabilistic model. The training of the model may be performed in a variety of ways including, but not limited to supervised learning and unsupervised learning (e.g., k-means clustering, hierarchical clustering, etc.). The probabilistic model may be represented by an algorithm $f(x)$ that includes a collection of neurons represented by the function $g_i(x)$. For example, it may be described by the function $f(x)=K(\Sigma_i w_i g_i(x))$ where a weight, w, is applied and K is a predefined function (e.g., a sigmoid). Other neural network algorithms including dynamic neural networks, static neural networks, etc. may be utilized according to the disclosed implementations.

The instant application is not limited to a particular training method or neural network. Beginning at 100, input data can be provided to the model at 110. Input data can be of virtually any form capable of representation. For example, it may be binary or source code from one or more files, alphanumeric strings, a matrix, etc. The probabilistic model may be applied to the input data at 120 to identify a feature of interest (e.g., a curve, or recognize text). For example, where the input data is a picture, the pixel data that make up the picture may be analyzed to determine a particular feature (e.g., recognize a curve, text, a facial expression, hand gesture, eye, etc.). In the case of malware, the model may be trained on known malware files. Based upon the results provided, the neurons in the probabilistic model may be weighted differently. The process may be performed iteratively until a stop parameter is reached at 130. The stop parameter may be a finite number of iterations, and/or a specified accuracy of the model (e.g., it accurately identifies 99% of the malware or correctly identifies text 85% of the time). Once the stop parameter is reached, the training simulation can end at 140.

Figure 2:
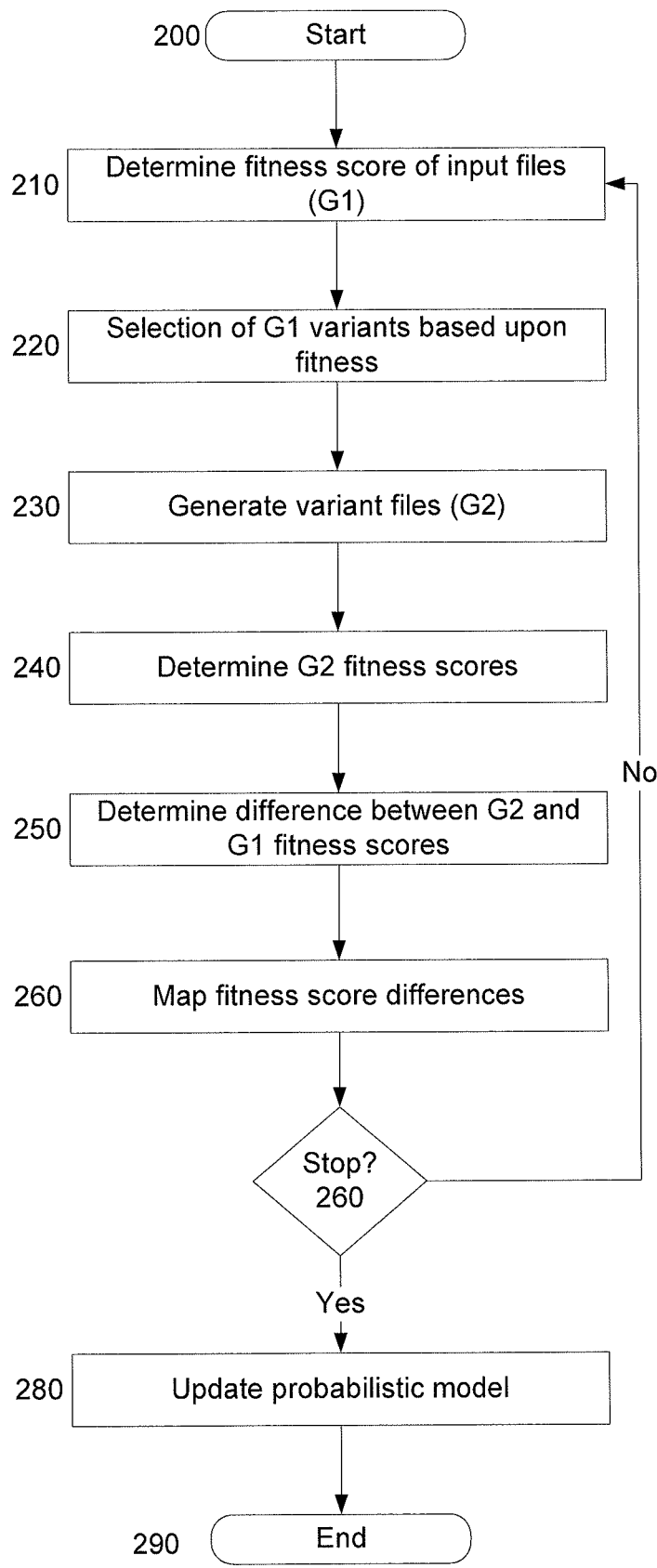
FIG. 2 is an example of generating hotspots of a given file based upon the probabilistic model.

FIG. 2 shows an example of a process for identifying hotspots according to an implementation disclosed herein. The process may begin at 200. A seed file may be obtained, and an evolutionary algorithm may be applied to the seed file to generate variants of the seed file. The seed file can be any binary or source file such as a malware file, an image file, or the like. In various embodiments, multiple seed files may be used. The instant application is not limited to a particular evolutionary algorithm. Briefly, an evolutionary algorithm may operate by causing a mutation in a progenitor file. A population of variants, each with unique mutations or with the same or overlapping mutations may be generated. A variant file, therefore, can refer to a file that contains a mutation as compared to a seed file or the variant file's progenitor. A mutation can refer to any number of changes to the file including, but not limited to a random mutation of binary code; a replacement of a system call; a replacement of a library call; a replacement of a command; an insertion of a system call; an insertion of a library call; an insertion of a command; a deletion of a system call; a deletion of a library call; a deletion of a command; a directed mutation based upon the mapping; a combination of different portions of related files; and a replacement, an insertion, or a deletion of one or more bytes. In some cases, a variant may be generated by merging parts of two or more sets of code. Thus, a generation of variant files can be produced from a progenitor file (e.g., a seed file or file from a previous generation).

Returning to FIG. 2, at 210, the resultant variant files can be evaluated for fitness to determine the effect of a given mutation on the variant file. The fitness score may be the difference between one and a probability, p, assigned by the probabilistic model to existence of a feature that does not exist in the electronic variant file. For example, the feature may be identifying a file as malware, and the probabilistic model may identify a file as malware. The number of variants generated for each iteration of the process in FIG. 2 may be based upon a desired population size, and/or computational power that is available to a given system. In the malware case, the seed file may be the binary or source code of a known or synthetically created malware. The probabilistic model may be trained to detect malware including the seed file. Each variant file may differ from another variant file of the same generation, as well as the progenitor or seed file in at least one byte. In some instances two variants may have substitutions for different portions of the file or even the same mutation. For example, in a 100 byte file, bytes 10-20 of a first variant may be different than those of all other variants. A probability, p, may be output by the probabilistic model for each of the variant files and a fitness score (1−p) may be computed for every tested file. The fitness score of a given file may be evaluated by running a simulation using physical and/or virtual machines and determining whether, for example, the malware is still performing any malicious action. In this example, for a given variant file, a predetermined number of simulations may be performed and the frequency at which the variant file is identified as malware by a malware detector may be stored as a probability value. Malicious activity can be identified by evidence left by the malware including network traffic, binary code, operating system and API calls, CPU activity, memory footprints, etc. As an example a machine with the malicious code of the variant file may attempt to attack a victim machine. The result of the attack can be recorded as either successful or failed.

In the case of malware, success may be evaluated based upon maliciousness and/or evasiveness. Evasiveness may reflect that ability of the malware to evade detection from one or more detection mechanisms (e.g., antivirus software). For example, a given machine may have ten malware detection mechanisms, and the malware may evade eight of them. It may be assigned a score as a percentage, such as 80%. In some cases this may be given a binary value based upon a threshold amount of detectors evaded. Maliciousness may refer to the ability of the variant to cause/display malicious activity/behavior. As with evasiveness, the score may be binary or on a scale. The results of the simulation, including the evasiveness and maliciousness computations, may be stored to memory or other machine readable storage. There are many possible ways of computing evasiveness and/or maliciousness. The disclosed implementations are not limited to a particular manner of computing such a score, nor is it necessary to compute both evasiveness and/or maliciousness. The disclosed implementations can involve any manner by which fitness of the variants can be evaluated. Furthermore, while the above example is in the context of malware, other file types and probabilistic models can be used with the disclosed implementations.

The fitness function computed at 210 can be represented as $f=\{$if malware failed: 0, and If malware works: 1−probability of input model$\}$. Fitness may be computed as a combination of evasiveness and maliciousness as a function such as $f=\{$if malware failed: 0, and if the malware was successful, an evasiveness weight may be multiplied by the number of evaded malware detectors plus the a success weight multiplied by the number of features that worked may be subtracted from the probability of the model. A feature may be scored as successful based upon preset criteria. For example, in the case of malware, the ability of a variant file to make a particular system call or unauthorized electronic transmission may be considered successful. The weights assigned in this example may be predetermined, or based upon a ML training. The probability of the model, therefore, may be inversely correlated with the fitness of the variant file (e.g., the higher the probability of the model, then the lower the fitness of the variant file is), and the fitness score may be reflection of multiple features that are being analyzed (e.g., evasiveness and maliciousness). As an example, if evasiveness and maliciousness are binary, a threshold of 1 may indicate that at least one of evasiveness or maliciousness was deemed successful. If the probabilistic model is a classifier that classifies a file as malicious (or not), then it may return a probability that a file is malicious. For example if the probability is 90%, there is a 90% likelihood that the file is malicious. Fitness may be computed for every individual variant file in a given generation. The probabilistic model may return a probability for each individual of the variant file population. For example, if a first individual file is malicious and the probabilistic model yields a probability of 23% to the first individual file, then its fitness may be computed as 1-0.23 or 0.77. As another example, if a probabilistic model for finding eyes in an image returns a value of 0.75 indicating a probability of 75% that an individual variant file contains eyes according to the model, then the fitness for the individual variant file may be 1-0.75 or 0.25. A feature can be the identification of a file as malware, identification of a feature of an image (e.g., face, eyes (open or closed), text, gesture, etc.), a system call, a library call, a pixel gradient, etc.

At 220, a selection can be performed by which the fittest variants from G1 are selected for "reproduction." The fittest individuals in a first generation may be those with the highest fitness score. In the first generation of variants, the fitness may be computed as one minus the value returned by the probabilistic model. The probability returned by the model, as mentioned earlier, may represent a measurement such as the combined evasiveness and maliciousness scores, whereas in subsequent generations, the fitness of the progenitor file may be known. For example, a seed file A, may have ten variant files in the first generation created from it, A1-A10. The probabilistic model, which may be trained to detect the existence of a feature, may be applied to each variant and return a probability as to the existence of a feature that is not detected in each variant.

In the selection at 220, a subset of the population of electronic files that have fitness scores that may satisfy a predetermined parameter may be selected. A predetermined parameter may be, for example, a threshold value (e.g., a fitness score above 0.75), a success rate in evading detection, or failing to identify a feature (e.g., recognizing a face, an animal, a text, a gesture, an eye position, speech, etc.), a percentage of the total population of variant files (e.g., the 20% fittest variant files), and/or a finite number of the fittest variants (e.g., the fittest 50 variants). Other selection methods may be employed as well. For example, the selection may be a tournament selection process where the fittest variants are selected in a knock-out based scenario. In some instances, the selection process may be a guided process where specific characteristics selected to survive according to fitness scores. For example, a variant that is not particularly malicious, but displays an ability to evade a malware detector (e.g., probabilistic model), may be selected for reproduction. The selection process may include a combination of any of the above methods.

Figure 3:
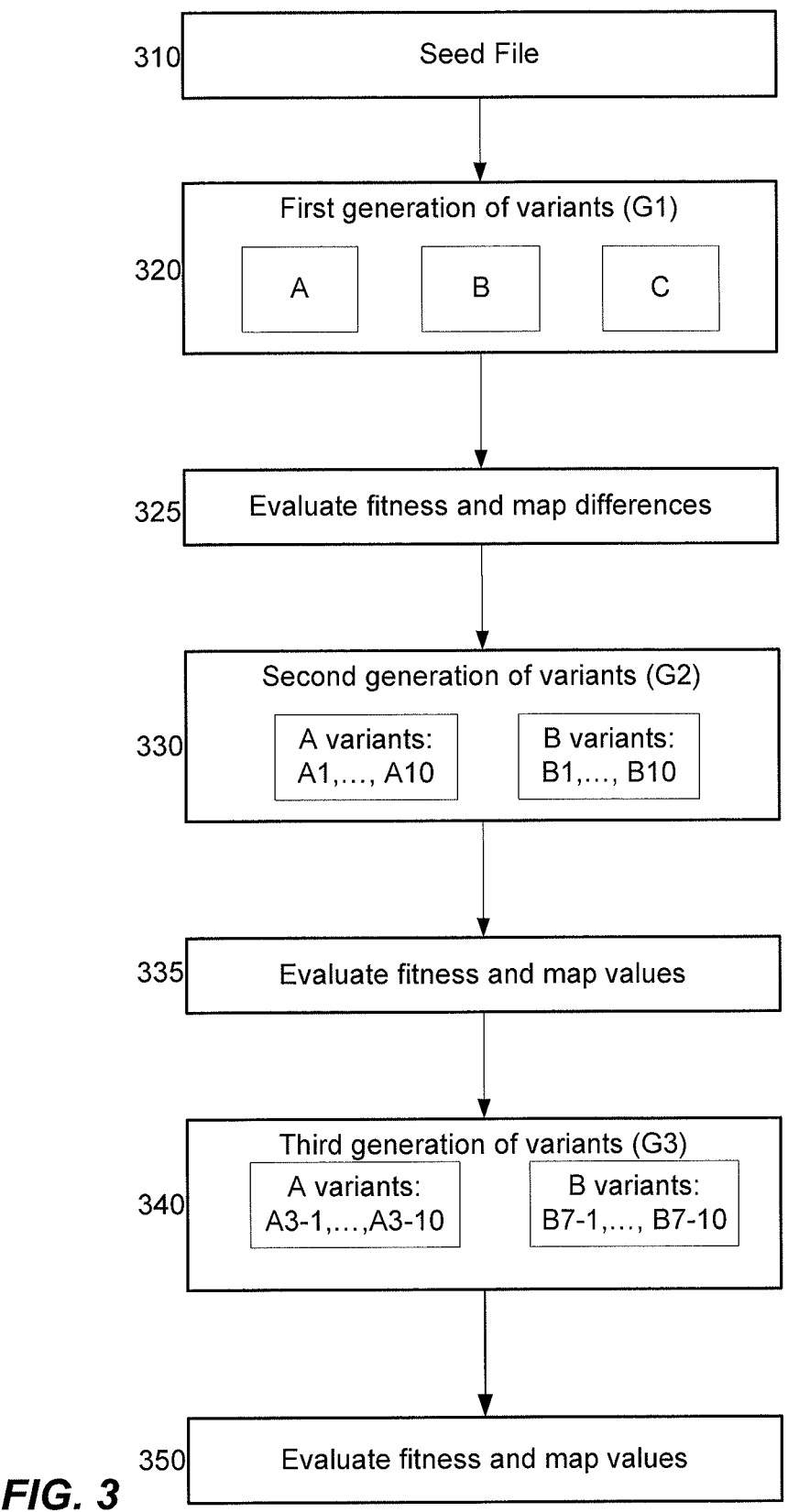
FIG. 3 shows an example of the creation of variant files and fitness evaluation process.

FIG. 3 shows an example of the creation of variant files and fitness evaluation process. At 310, a seed file is obtained. The seed file can be a synthetic file or a file that is publicly available such as an image file or a known malware file. For example, if a probabilistic model is trained to identify cats in images, a seed file may contain an image of a cat. From the seed file, a first generation of variants may be generated by an evolutionary algorithm, for example, at 320. Variants may also be generated in a directed manner to target specific portions of a file or features of an image if there is some prior knowledge about portions of the seed file that expose weaknesses of the probabilistic model. In FIG. 3, the variant files of generation one (G1) are represented by A, B, and C. Each of these variants may differ from one another and the seed file; in some instances different variant files may receive the same mutation as another variant file in the instant or subsequent generation. Fitness of each variant file may be computed, and at least one of the fitness and/or the difference between each individual variant and its progenitor in 320 may be computed at 325. The fitness score and/or differences may be mapped to identify one or more hotspots. At 330, a second generation of variant files may be generated using the evolutionary algorithm based upon the hotspot map and/or selection of desired variants according to criteria described earlier. In the example shown in FIG. 3, the files A and B of G1 were selected as the fittest among the groups. At 330, the population is expanded to include ten variants of file A and ten variants of file B to form the second generation of variants.

As stated previously, the number of variants generated with each generation, and/or the number of files from the previous generation that are selected may be based upon a predefined parameter. The variant files of generation two (G2) may be generated using any of the aforementioned processes (e.g., an evolutionary algorithm or guided mutagenesis). The fitness of the G2 variants may be computed as one minus the probability obtained from the probabilistic model as described previously at 335. The difference between the fitness of G2 variant files and the corresponding progenitor file from the G1, and/or the fitness score obtained at 335 may be mapped to the seed file at 335. Variant files may be selected according to criteria described earlier. At 340, a third generation of variants may be created using the evolutionary algorithm. In this example, the G2 variants A3 and B7 are selected, but other or additional "A" or "B" variants can be selected as well (e.g., A3, A7, and A10 may all be selected for further mutation. The population of third generation variant files can again be expanded based upon the selected variant files at 340. The fitness of these variants can be evaluated as previously described. At each iteration of variant file generation, the number of variant files generated may be determined based upon a predefined number (e.g., 10 variants per selected file), and/or other criteria such as based upon the capability of the computer to perform the simulations/evaluations, the number of variants required to statistically identify a hotspot, etc.

Prior to any or each of the selection processes illustrated in FIG. 3, but after computing the fitness of each variant in a generation, a hotspot may be identified (as later described). The fitness scores, and identification of hotspots (e.g., location of hotspots) based thereupon, may be stored in machine readable memory and/or storage. The selection of variants from which the next generation of variants is produced may be based on an identified hotspot in some configurations. At 350, fitness may be computed for the third generation of variant files and the values may be mapped to the seed file and/or a progenitor file. Thus, in the example illustrated in FIG. 3, identified hotspots may be applied to guide selection/mutagenesis of subsequent iterations with each generation of variants. Similarly, the number of generations that are created can be predefined, based upon the likelihood that a hotspot has been identified, a population of individuals with a mean fitness score of a specified value (e.g., all members of the last generation of variants have an 85% chance of evading detection, or a cat is not identified 85% of the time).

FIG. 3 is an example of how the population of files changes with each iteration. The mutations for each iteration of the process may be based upon the fitness score of the previous generation. In some implementations, variant files for the next generation may be produced using a random mutagenesis approach with regard to the fittest individuals of the previous generation, or it may be guided based upon a previously identified hotspot.

Returning to FIG. 2, at 230, variant files may be generated for a second generation (G2) of the files from the first generation (G1) that were selected at 220. Those files from G1 that satisfy a predetermined parameter may be chosen for a subsequent mutation phase in which G2 variant files are generated by introducing mutations into selected G1 variants with an evolutionary algorithm. As mentioned above, this process can be used to maintain a population of files of a predefined size. The G2 variant files may have at least one characteristic changed compared to the G1 electronic files. For example, a characteristic may refer to a byte, a library call, a system call, an API call, and the insertion, deletion, and/or replacement of any portion of the code corresponding to the file. In some cases, a variant may be generated by fusing segments from two different variants.

Fitness scores for each of the G2 variant files may be determined at 240. Each fitness score may refer to the difference between one and a probability, p, assigned by the probabilistic model to existence of a feature that does not exist in the variant file. The difference between the fitness scores of the G2 variant files and its corresponding progenitor G1 file may be computed at 250. In some implementations, G2 may be assigned to G1 in preparation for the next iteration of the process. In FIG. 3, the fitness scores for each of the A3-1 to A3-10 files at 340 may be computed, and the difference between these scores and the fitness score of the A3 variant at 330 may be determined. Similarly, the fitness scores for each of the B7-1 to B7-10 files at 340 may be computed, and the difference between these scores and the fitness score of the B7 variant at 330 may be determined. The difference for each variant file and its progenitor may be mapped to the seed file or the progenitor file to identify a hotspot. Such a mapping may indicate which additional mutations combine to increase the likelihood that the model fails to detect the existence of a feature. For example, a single mutation at one location in a file may have a more pronounced effect in combination with a mutation, made in a subsequent generation variant file, in a different part of the file In some configurations, a hotspot may be identified based upon either the fitness scores for the G2 variant files and/or the difference between the G2 variant files and the corresponding G1 progenitor file. As mentioned earlier, the process of (1) generating variant files, (2) computing fitness of the variant files and/or computing differences between the current variant files populations and its corresponding progenitor, and (3) applying selection criteria (e.g., fittest variants, most evasive variants, etc.) to select a subset of variants may be repeated until a predefined parameter is satisfied at 270. If the parameter is not met, the process may repeat. The predefined parameter may be a finite number of generations, a threshold fitness score, or a statistical confidence in the hotspot mapping (e.g., a statistical test identifies a region of the file as significant).

The differences between the G2 variant files and respective progenitors and/or the G2 fitness scores may be mapped to the seed file to determine a region of the seed file for which the probabilistic model fails to detect the feature that is being evaluated (e.g., for malware, the feature could be the detection of the malware) at 260. As stated earlier, in some configurations, a hotspot may be computed after evaluation of the fitness of the variants for each cycle of the process. The mapping at 260 may reveal one or more hotspots. Once the iterative process satisfies the predefined parameter at 270, the probabilistic model may be updated at 280. The process may terminate at 290.

A hotspot may be identified from the generations in many ways. In an implementation, the hotspot is identified by mapping a histogram of changes in members of the population with high fitness. In an implementation, a sliding window may be applied to the entirety of the file to identify regions in which the fitness scores (or differences) are more prevalent. For example, a threshold may be applied to the map generated by the sliding window. Those regions where mutations are associated with a fitness score above the threshold may be considered hotspots. The map, therefore, may provide an indication of where the probabilistic model is weak (e.g., fails to detect a feature). Based upon the identified region, the probabilistic model can be updated at 280. For example, if the hotspot determines that the model can identify cats in pictures, but has a problem identifying cats with long hair, the model can be retrained using a process such as the one described in FIG. 1. For example, the model may be trained by providing it with a series of pictures of cats with long fur. In the case of an ANN, may involve alteration of weights of one or more neurons as a part of the retraining process. Subsequent to updating, the model can again be tested against the fittest members from the last generation of variants of the process.

Figure 7:
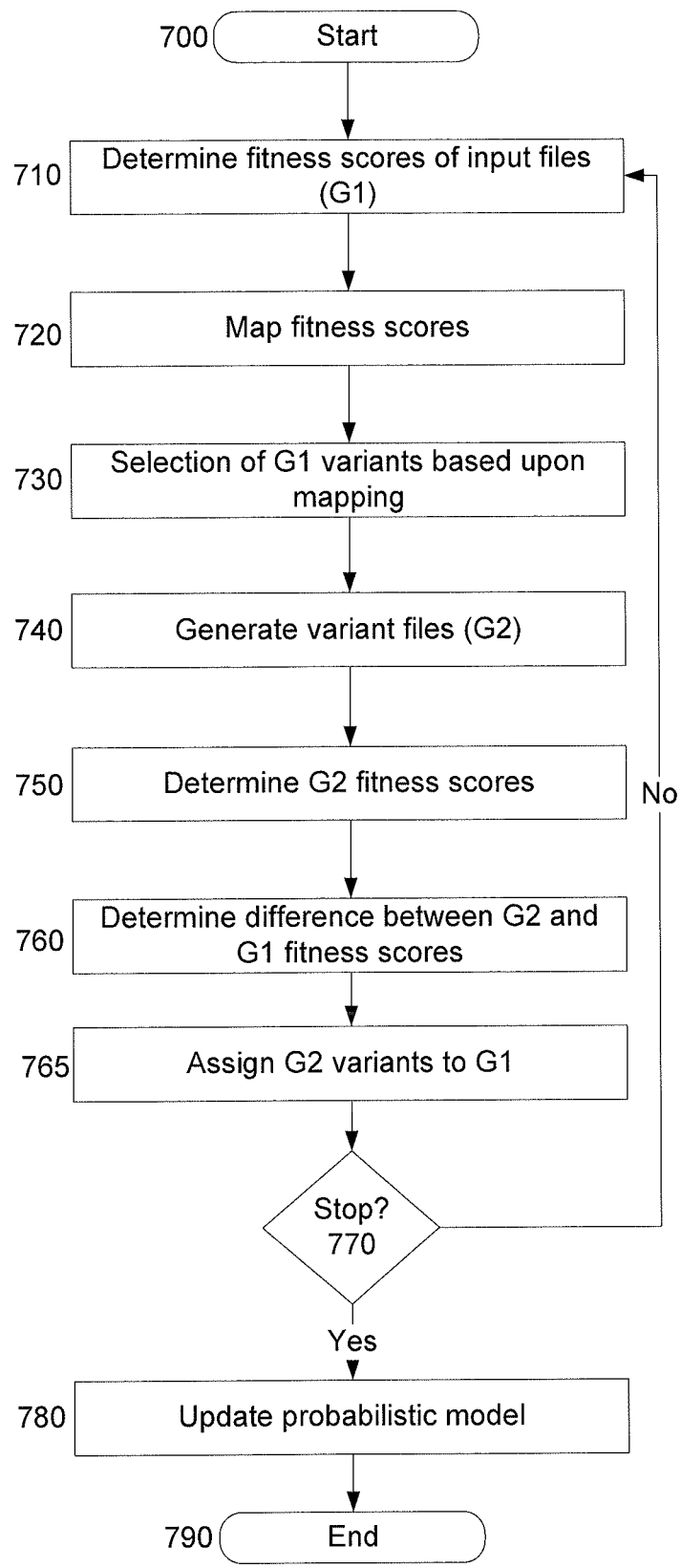
FIG. 7 shows an example of a process for using hotspots to select regions of the seed file to focus upon for further analysis according to an implementation disclosed herein.

FIG. 7 shows an example of a process for using hotspots to select regions of the seed file to focus upon for further analysis according to an implementation disclosed herein. The process may begin at 700. As described above, a seed file may be obtained, and an evolutionary algorithm may be applied to the seed file to generate variants of the seed file, to produce a first generation of variant files can be produced from a progenitor file (e.g., a seed file for the first generation). At 710, the resultant variant files can be evaluated for fitness as described herein to determine the effect of a given mutation on the variant file as previously described. The fitness scores may be computed and mapped to the seed file at 720 to identify a region of interest. For example, a region of interest or hotspot may be identified as a region that has a concentration of variants that have high fitness scores as described earlier with regard to hotspot detection. Thus, in Example 7, the iterative process can be guided by the early identification of a hotspot.

At 730, a selection of the fittest variants for "reproduction" may be based upon the mapping as described above. At 740, variant files may be generated for a second generation (G2) of the files from the first generation (G1) that were selected at 730. As above, an evolutionary algorithm or directed mutation(s) may be applied to the selected G1 files to generate the G2 variant files. As with the first generation of variant files, fitness scores may be determined or computed for the G2 variant files at 750. The fitness scores may refer to the likelihood that the probabilistic model fails to detect the feature in the G2 variant files. At 760, a difference between fitness scores for each variant and its corresponding progenitor. At 765, the G2 variants may be assigned as G1 variants so that the process may be restarted for the next iteration. The process of (1) generating variant files, (2) evaluating fitness of the variant files and/or computing differences between the current variant files populations and its corresponding progenitor, and (3) applying selection criteria for the region identified in 720, to select a subset of variants may be repeated until a predefined parameter, as described above, is satisfied at 770. If the parameter is not met, the process may repeat beginning with step 710 including the generation of variants. In Example 7, the process of mapping fitness scores with each round may be utilized to guide the mutagenesis of variants in each round. In the last iteration of the process, the differences between the G2 variant files and respective progenitors and/or the G2 fitness scores may be mapped to the seed file to determine a region (or sub-region) of the seed file for which the there is an aggregation of mutations that improve fitness of the variant files. As stated earlier, in some configurations, a hotspot may be computed after evaluation of the fitness of the variants for each cycle of the process. The mapping may reveal one or more hotspots within the region initially identified at 710. The resultant mapping from the final iteration, therefore, may provide an indication of where the probabilistic model is weak (e.g., fails to detect a feature). Based upon the identified region, the model probabilistic model can be updated at 780. The process may terminate at 790.

Figure 4:
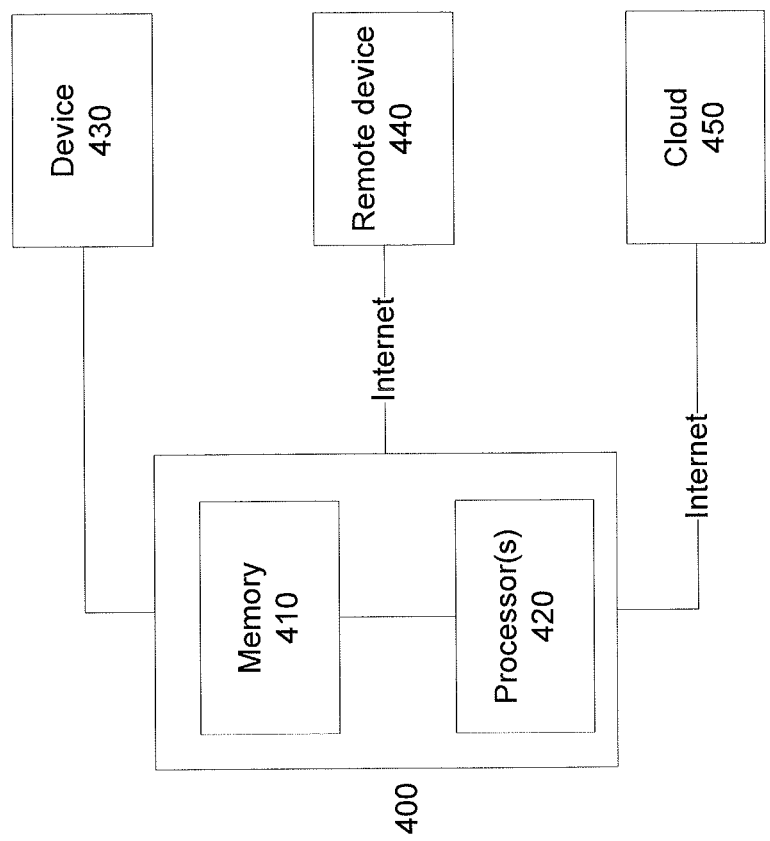
FIG. 4 is an example configuration of a system according to an implementation disclosed herein.

FIG. 4 is an example configuration of a system according to an implementation disclosed herein that includes a memory 410, and one or more hardware processors 420. These components can be integrated into a single device 400, or be in separate devices. The memory 410 may be a non-transitory memory that can store information about one or more fitness scores and/or a difference between a fitness score for one generation and a progenitor generation. Memory 410 may also refer to a database that is connected to the system 400.

The one or more hardware processors 420 may be coupled to the memory 410 and configured to read instructions from the memory 410 to cause the system to perform any of the operations previously described, including those in FIGS. 1-3. The system may be connected to one or more devices 430, 440 that are locally connected (e.g., 430) to the system or remotely connected via the Internet (e.g., 440). The devices may be utilized to perform simulations as a component of the fitness score evaluation. For example, the system 400 may configure one device 430 to be targeted with malware and have that device attempt to infect another remote or locally connected device. In some instances, the system 400 may connect to a cloud based system and be configured to execute simulations on one or more virtual machines associated with the cloud 450. Electronic communication between the remote device and cloud may be performed through a wireless and/or Ethernet protocol.

Figure 5:
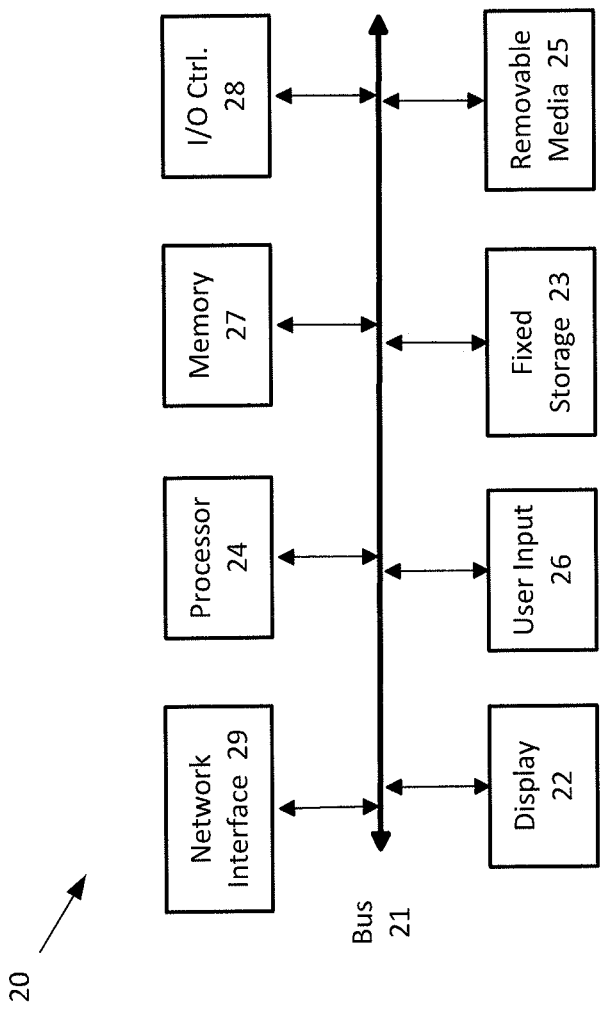
FIG. 5 is an example computer suitable for implementing embodiments of the presently disclosed subject matter.

Embodiments of the presently disclosed subject matter may be implemented in and used with a variety of component and network architectures. FIG. 5 is an example computer 20 (e.g., electronic device such as a server, desktop computer, laptop, etc.) suitable for implementing embodiments of the presently disclosed subject matter. The computer 20 includes a bus 21 which interconnects major components of the computer 20, such as a central processor (e.g., CPU) 24, a memory 27 (typically RAM, but which may also include read-only memory ("ROM"), flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like. Memory 27 may also refer to machine readable storage such as a database. In the implementations disclosed above, a variety of data may be stored in short term and/or long term memory including, but not limited to, a seed file, variant electronic file(s), fitness score(s), difference of fitness score(s), mapping of fitness scores and/or differences of fitness scores, a probabilistic model, one or more hotspot locations, etc.

The bus 21 allows data communication between the central processor 24 and the memory 27, which may include ROM or flash memory (neither shown), and RAM (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, digital satellite data connection or the like. For example, the network interface 29 may allow the computer to communicate with other computers via one or more local, wide-area, or other networks. Many other devices or components (not shown) may be connected in a similar manner (e.g., hard disk drives, displays, etc.). Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 27, fixed storage 23, removable media 25, or on a remote storage location. The code may be instructions executable to cause a machine to perform operations of the disclosed implementations such as the examples provided in FIGS. 1-3. The code may be stored on non-transitory machine-readable medium.

Figure 6:
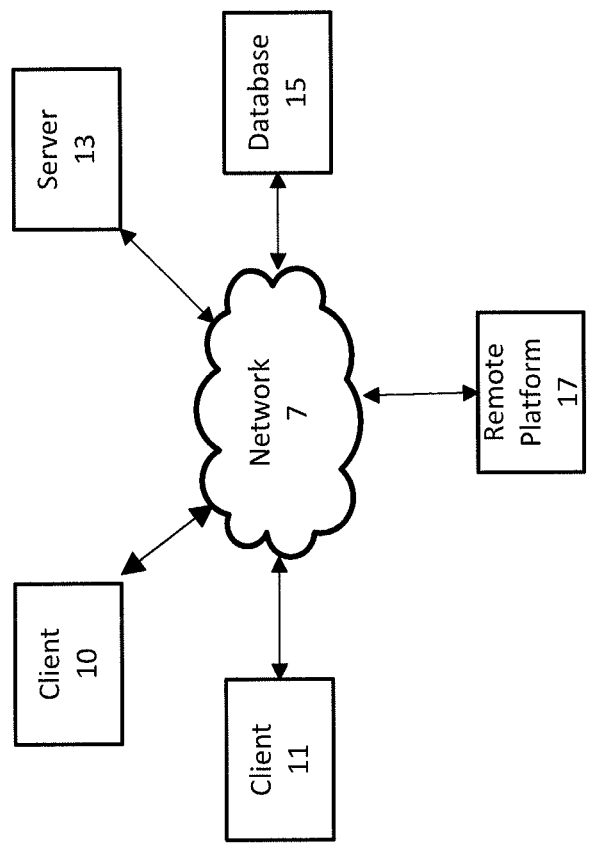
FIG. 6 shows an example network arrangement according to an embodiment of the disclosed subject matter.

FIG. 6 shows an example network arrangement according to an embodiment of the disclosed subject matter. One or more clients 10, 11, such as local computers, or virtual machines, and the like may connect to other devices via one or more networks 7. As described earlier, the communication partner may operate a client device that is remote from the device operated by the user (e.g., in separate locations). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. In some configurations, at least one of the clients 10, 11 and/or server 13 may perform the operations disclosed herein.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter.

When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A computer-implemented method, comprising:
   determining a first fitness score for each of a population of electronic files generated from a seed file, the first fitness score for a given electronic file being a difference between one and a probability, p, assigned by a probabilistic model to existence of a feature in the given electronic file;
   selecting a subset of the population of electronic files that have fitness scores that satisfy a first parameter, the selected subset constituting a first generation of variant electronic files;
   generating a second generation of variant electronic files for each of the first generation of variant electronic files, each of the second generation of variant electronic files having at least one characteristic changed compared to the first generation of variant electronic files;
   determining second generation fitness scores for each member of the second generation, the second generation fitness score for a given member of the second generation of variant electronic files being a difference between one and a probability, p, assigned by the probabilistic model to the existence of the feature in the given member of the second generation of variant electronic files;
   determining differences between the second generation fitness scores and first generation fitness scores for each member of the second generation and its corresponding first generation progenitor;
   mapping at least one of the differences to the seed file to determine a region of the seed file for which the probabilistic model fails to detect the feature; and
   modifying the probabilistic model based upon the region of the seed file that is mapped by retraining the probabilistic model with additional examples corresponding to the region of the seed file for which the probabilistic model fails to detect the feature.

2. The computer-implemented method of claim 1, wherein generating the second generation of variant electronic files is based upon a location of the at least one characteristic that changed compared to the first generation of variant electronic files.

3. The computer-implemented method of claim 1, wherein the first generation of variant electronic files is generated by a mutation selected from the group consisting of: a random mutation of binary code; a replacement of a system call; a replacement of a library call; a replacement of a command; an insertion of a system call; an insertion of a library call; an insertion of a command; a deletion of a system call; a deletion of a library call; a deletion of a command; a directed mutation based upon the mapping; a combination of different portions of related files; and a replacement, an insertion, or a deletion of one or more bytes.

4. The computer-implemented method of claim 1, wherein the feature that the probabilistic model detects is selected from the group consisting of: a malware, an image, a system call, a library call, a pixel gradient, a text, a hand position, and an eye position.

5. The computer-implemented method of claim 1, wherein generating the second generation of variant electronic files utilizes an evolutionary algorithm.

6. The method of claim 1, wherein the seed file is an image file, the probabilistic model is an image recognition algorithm, and the feature is a particular type of visual information in an image.

7. The method of claim 6, wherein the additional examples are additional images that contain the particular type of visual information.

8. A system, comprising:
a non-transitory memory;
one or more hardware processors coupled to the non-transitory memory and configured to read instructions from the non-transitory memory to cause the system to perform operations comprising:
determining a first fitness score for each of a population of electronic files generated from a seed file, the first fitness score for a given electronic file being a difference between one and a probability, p, assigned by a probabilistic model to existence of a feature in the given electronic file;
based on the first fitness score for each of the population of electronic files, determining a first region of the seed file for which the probabilistic model fails to detect the feature;
based upon the first region, selecting a subset of the population of electronic files that have fitness scores that satisfy a first parameter within a region of interest in the seed file, the selected subset constituting a first generation of variant electronic files;
generating a second generation of variant electronic files for each of the first generation of variant electronic files, each of the second generation of variant electronic files having at least one characteristic changed compared to the first generation of variant electronic files;
determining second generation fitness scores for each member of the second generation, the second generation fitness score for a given member of the second generation of variant electronic files being a difference between one and a probability, p, assigned by the probabilistic model to the existence of the feature in the given member of the second generation of variant electronic files;
determining differences between the second generation fitness scores and first generation fitness scores for each second generation member and a corresponding first generation progenitor of the second generation member;
based on mapping at least one of the differences determining a second region of the seed file for which the probabilistic model fails to detect the feature; and
modifying the probabilistic model based upon the second region of the seed file by retraining the probabilistic model with additional examples corresponding to the second region of the seed file.

9. The system of claim 8, further comprising generating the second generation of variant electronic files based upon a location of the at least one characteristic that changed compared to the first generation of variant electronic files.

10. The system of claim 8, wherein the first generation of variant electronic files is generated by a mutation selected from the group consisting of: a random mutation of binary code; a replacement of a system call; a replacement of a library call; a replacement of a command; an insertion of a system call; an insertion of a library call; an insertion of a command; a deletion of a system call; a deletion of a library call; a deletion of a command; a directed mutation a combination of different portions of related files; and a replacement, an insertion, or a deletion of one or more bytes.

11. The system of claim 8, wherein the feature that the probabilistic model detects is selected from the group consisting of: a malware, an image, a system call, a library call, a pixel gradient, a text, a hand position, and an eye position.

12. The system of claim 8, wherein generating the second generation of variant electronic files utilizes an evolutionary algorithm.

13. The system of claim 8, wherein the seed file is an image file, the probabilistic model is an image recognition algorithm, and the feature is a particular type of visual information in an image.

14. The system of claim 13, wherein the additional examples are additional images that contain the particular type of visual information.

15. A non-transitory machine-readable medium having stored thereon machine-readable instructions executable to cause a machine to perform operations comprising:
i. generating a population of electronic files from a malware seed file;
ii. determining a first fitness score for each of the population of electronic files generated from a malware seed file, the first fitness score for a given electronic file being a difference between one and a probability, p, assigned to the likelihood that the given electronic file evades detection by a malware detector;
iii. selecting a subset of the population of electronic files having fitness scores that satisfy a first parameter, the selected subset constituting a first generation of variant electronic files;
iv. generating a second generation of variant electronic files for each of the first generation of variant electronic files, the second generation of variant electronic files having at least one characteristic changed compared to the first generation of variant electronic files;
v. determining second generation fitness scores for each member of the second generation, the second generation fitness score for a given member of the second generation of variant electronic files being a difference between one and a probability, p, assigned to the likelihood that the given member of the second generation of variant electronic files evades detection by the malware detector;
vi. determining differences between the second generation fitness scores and first generation fitness scores for each member of the second generation and its corresponding first generation progenitor, and subsequently assigning the second generation of variant electronic files as the first generation of variant electronic files;
vii. iteratively repeating steps ii to vi until a second parameter is satisfied;
viii. based on at least one of the differences, determining a region of the seed file for which changes accumulate such that the malware detector fails to identify variants of the seed file as malware; and
ix. modifying the malware detector based upon the region of the seed file that is mapped by retraining the malware detector with additional examples corresponding to the region of the seed file.

16. The non-transitory machine-readable medium of claim 15, wherein determining the region of the seed file is based on a histogram of changes in members of the population with fitness above a threshold value.

17. The non-transitory machine-readable medium of claim 15, wherein generating the second generation of variant electronic files is based upon a location of the at least one characteristic changed compared to the first generation of variant electronic files.

18. The non-transitory machine-readable medium of claim 15, wherein determining the region of the seed file is based on a sliding window applied to the seed file based upon the fitness scores for each member of the second generation.

19. The non-transitory machine-readable medium of claim 15, wherein generating the second generation of variant electronic files utilizes an evolutionary algorithm.

\* \* \* \* \*